(12) United States Patent
Shimoda et al.

(10) Patent No.: US 11,587,751 B2
(45) Date of Patent: Feb. 21, 2023

(54) ELECTROMAGNETIC RELAY AND TERMINAL BLOCK

(71) Applicant: OMRON Corporation, Kyoto (JP)

(72) Inventors: Seiki Shimoda, Yamaga (JP); Kenshi Hayashida, Kumamoto (JP); Takeshi Noguchi, Yamaga (JP)

(73) Assignee: OMRON CORPORATION, Kyoto (JP)

( * ) Notice: Subject to any disclaimer, the term of this patent is extended or adjusted under 35 U.S.C. 154(b) by 363 days.

(21) Appl. No.: 16/956,655

(22) PCT Filed: Dec. 26, 2018

(86) PCT No.: PCT/JP2018/047892
§ 371 (c)(1),
(2) Date: Jun. 22, 2020

(87) PCT Pub. No.: WO2019/142637
PCT Pub. Date: Jul. 25, 2019

(65) Prior Publication Data
US 2020/0411267 A1 Dec. 31, 2020

(30) Foreign Application Priority Data

Jan. 22, 2018 (JP) .............................. JP2018-008313

(51) Int. Cl.
*H01H 47/22* (2006.01)
*H01H 47/32* (2006.01)
(Continued)

(52) U.S. Cl.
CPC .......... *H01H 50/021* (2013.01); *H01H 47/22* (2013.01); *H01H 47/32* (2013.01);
(Continued)

(58) Field of Classification Search
CPC ...... H01H 47/22; H01H 47/32; H01H 50/021; H01H 50/04; H01H 50/14; H01H 50/443; H01H 50/44
See application file for complete search history.

(56) References Cited

U.S. PATENT DOCUMENTS

2002/0109569 A1* 8/2002 Yamashita ........... H01H 50/443
335/129
2009/0080133 A1 3/2009 Chaudhuri et al.
(Continued)

FOREIGN PATENT DOCUMENTS

CN 2212833 Y 11/1995
CN 2539272 Y 3/2003
(Continued)

OTHER PUBLICATIONS

Chinese Office Action dated Dec. 30, 2021 in a counterpart Chinese patent application.
(Continued)

*Primary Examiner* — Sisay G Tiku
(74) *Attorney, Agent, or Firm* — Metrolex IP Law Group, PLLC

(57) ABSTRACT

An electromagnetic relay and a terminal block each include a voltage converter. The voltage converter is located adjacent to a coil and electrically connected to first coil terminals and second coil terminals. The voltage converter converts a power supply voltage input through one of the first coil terminals to a set value different from the input power supply voltage and outputs the power supply voltage to an electromagnet through one of the second coil terminals.

9 Claims, 7 Drawing Sheets

(51) Int. Cl.
*H01H 50/02* (2006.01)
*H01H 50/04* (2006.01)
*H01H 50/14* (2006.01)
*H01H 50/44* (2006.01)
*H02M 3/04* (2006.01)

(52) U.S. Cl.
CPC ............. *H01H 50/04* (2013.01); *H01H 50/14* (2013.01); *H01H 50/443* (2013.01); *H02M 3/04* (2013.01)

(56) References Cited

U.S. PATENT DOCUMENTS

| | | | |
|---|---|---|---|
| 2013/0119958 A1* | 5/2013 | Gasperi | H02M 1/10 323/299 |
| 2013/0121048 A1* | 5/2013 | Gasperi | H02M 3/156 363/89 |
| 2013/0234620 A1* | 9/2013 | Wang | H05B 45/3725 315/298 |
| 2014/0192571 A1* | 7/2014 | Gasperi | G05F 1/468 361/18 |
| 2014/0300345 A1 | 10/2014 | Liu | |
| 2018/0047537 A1* | 2/2018 | Sasaki | H01H 50/443 |
| 2018/0144895 A1 | 5/2018 | Shimoda et al. | |

FOREIGN PATENT DOCUMENTS

| | | | | |
|---|---|---|---|---|
| CN | 2929948 | Y | 8/2007 | |
| CN | 102522274 | A | 6/2012 | |
| CN | 102969203 | A | 3/2013 | |
| CN | 103117190 | A | 5/2013 | |
| CN | 203787358 | U | 8/2014 | |
| CN | 106935443 | A | 7/2017 | |
| EP | 1471556 | A2 * | 10/2004 | ............. H01H 50/08 |
| EP | 2040279 | A1 * | 3/2009 | ........... H01H 47/223 |
| EP | 3435396 | A1 * | 1/2019 | ............. H01H 47/02 |
| EP | 3317892 | B1 | 8/2019 | |
| JP | S56-076240 | A | 6/1981 | |
| JP | H09-231893 | A | 9/1997 | |
| JP | 2003-331705 | A | 11/2003 | |
| JP | 2009-76457 | A | 4/2009 | |
| JP | 3185026 | U | 7/2013 | |
| JP | 2017-54758 | A | 3/2017 | |
| WO | WO-2009139367 | A1 * | 11/2009 | ........... H01H 50/043 |
| WO | WO-2016152444 | A1 * | 9/2016 | ........... H01H 50/443 |
| WO | 2017001371 | A1 | 1/2017 | |

OTHER PUBLICATIONS

An English translation of the International Search Report ("ISR") of PCT/JP2018/047892 dated Apr. 16, 2019.
The Written Opinion("WO") of PCT/JP2018/047892 dated Apr. 16, 2019.

* cited by examiner

ELECTROMAGNETIC RELAY AND TERMINAL BLOCK

FIELD

The present disclosure relates to an electromagnetic relay and a terminal block connectable to the electromagnetic relay.

BACKGROUND

Patent Literature 1 describes an electromagnetic relay including a base, an electromagnetic device and a contact mechanism mounted on the base, and a case attached to the base to cover the electromagnetic device and the contact mechanism. The electromagnetic device in the electromagnetic relay includes a spool including a substantially cylindrical body and flanges on both ends of the body in the length direction and a coil wound around the body of the spool.

CITATION LIST

Patent Literature

Patent Literature 1: Japanese Unexamined Patent Application Publication No. 2017-54758

SUMMARY

Technical Problem

For the electromagnetic relay, a power supply voltage to be input to the electromagnetic device is preset, and the dedicated coil uses a wire with a diameter corresponding to the preset power supply voltage. To apply multiple power supply voltages with different levels, for example, the electromagnetic device includes different coils dedicated to the multiple power supply voltages. Thus, changing the power supply voltage settings may be difficult.

One or more aspects of the present disclosure are directed to an electromagnetic relay and a terminal block that can use multiple different power supply voltages.

Solution to Problem

An electromagnetic relay according to one aspect of the present disclosure includes a base having a mount surface, a case attached to the base and covering the mount surface to define a compartment with the mount surface, an electromagnet including a coil, first coil terminals extending from outside the compartment into the compartment in a direction intersecting with the mount surface and fixed to the base, and second coil terminals electrically connected to the coil and located electrically independent of the first coil terminals, and housed in the compartment and fixed to the mount surface, and a voltage converter located adjacent to the coil and electrically connected to the first coil terminals and the second coil terminals to convert a power supply voltage input through one of the first coil terminals to a set value different from the input power supply voltage and output the power supply voltage to the electromagnet through one of the second coil terminals.

A terminal block according to another aspect of the present disclosure is connectable to an electromagnetic relay including a relay housing and an electromagnet. The relay housing includes an internal first compartment. The electromagnet includes coil terminals extending from outside the first compartment into the first compartment, housed in the first compartment, fixed to the relay housing, and to be powered by a power source through the coil terminals. The terminal block includes a terminal block housing including an internal second compartment, first terminal connectors housed in the second compartment and connectable to a power source terminal of the power source, second terminal connectors housed in the second compartment and connectable to the coil terminals in the electromagnetic relay connected to the connecting surface, and a voltage converter housed in the second compartment and electrically connected to the first terminal connectors and the second terminal connectors. The voltage converter converts a power supply voltage input through one of the first terminal connectors to a set value different from the input power supply voltage and outputs the power supply voltage to the electromagnet through one of the second terminal connectors.

Advantageous Effects

The electromagnetic relay includes the voltage converter that uses one power supply voltage selected from multiple different power supply voltages and can thus use multiple different power supply voltages without replacement of its components (e.g., a coil).

The terminal block includes the voltage converter that uses one power supply voltage selected from multiple different power supply voltages and thus allows the connected electromagnetic relay to use multiple different power supply voltages without replacement of components (e.g., the coil) of the electromagnetic relay.

DETAILED DESCRIPTION

Embodiments of the present disclosure will now be described with reference to the accompanying drawings. The terms indicating specific directions or positions (e.g., up, down, right, and left) used herein as appropriate are for easy understanding of the present disclosure with reference to the drawings, and do not limit the technical scope of the present disclosure. The embodiments described below are mere examples and do not limit the scope of the present disclosure and its applications or use. The drawings are schematic and may not be drawn to scale relative to the actual size of each component.

Figure 1:
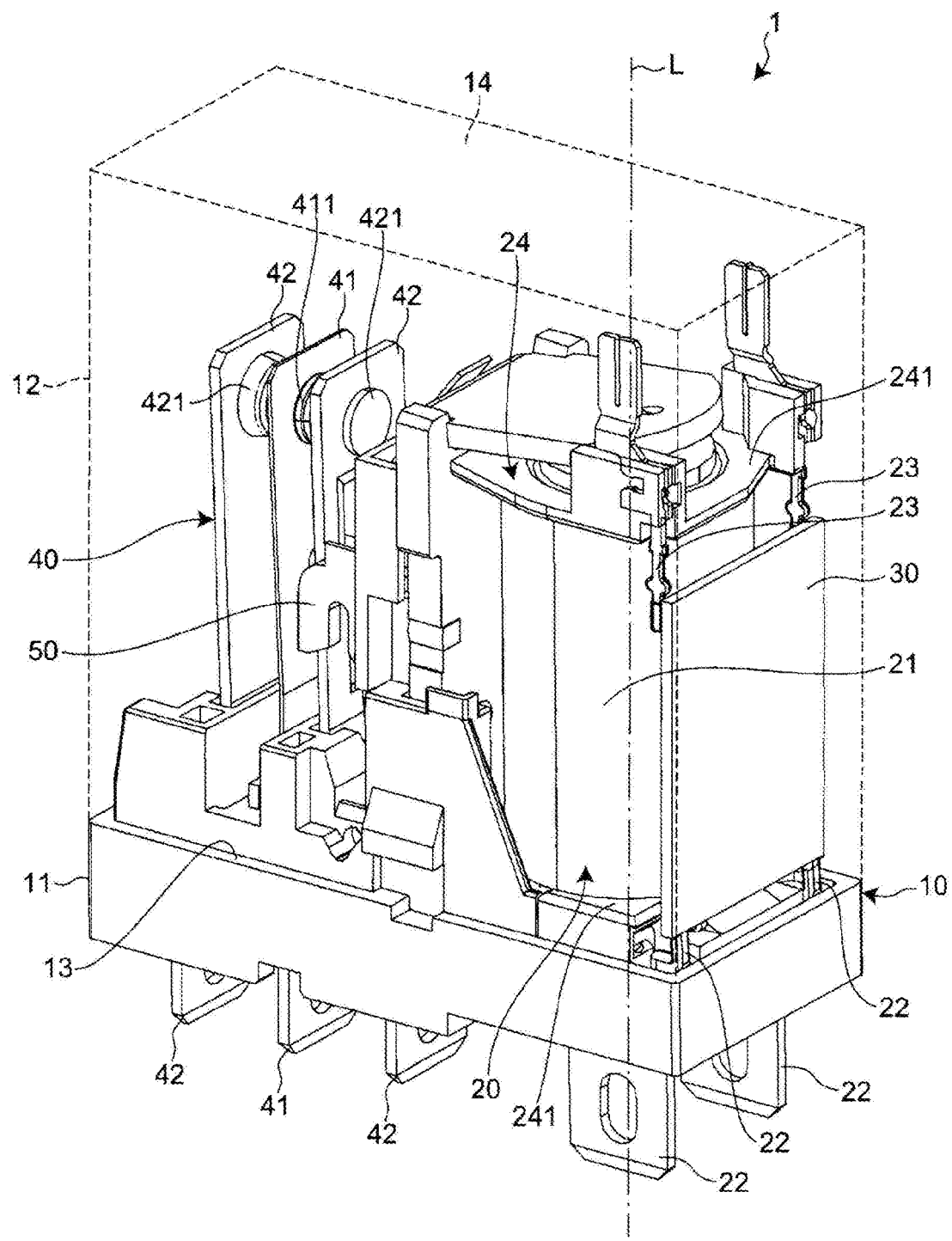
FIG. 1 is a perspective view of an electromagnetic relay according to an embodiment of the present disclosure.

As shown in FIG. 1, an electromagnetic relay 1 according to an embodiment of the present disclosure includes a substantially rectangular housing 10 including a base 11 and a case 12. The base 11 has a mount surface 13. The case 12 is attached to the base 11 and covers the mount surface 13 of the base 11. The housing 10 includes an internal compartment 14 defined by the mount surface 13 of the base 11 and the case 12.

The compartment 14 contains an electromagnet 20, an integrated circuit (IC) converter module 30, and a contact mechanism 40.

As shown in FIG. 1, the electromagnet 20 is housed in the compartment 14 and fixed to the mount surface 13 of the base 11. The electromagnet 20 includes a coil 21, two first coil terminals 22, and two second coil terminals 23. The electromagnet 20 receives a power supply voltage input through one of the first coil terminals 22.

In detail, the electromagnet 20 includes a spool 24 including a cylindrical body extending along a coil axis L extending in a direction intersecting with (e.g., orthogonal to) the mount surface 13 and flanges 241 on both ends of the body in the extending direction, and the coil 21 wound around the body of the spool 24. The coil 21 is thus wound about the coil axis L extending in the direction intersecting with (e.g., orthogonal to) the mount surface 13.

The first coil terminals 22 are arranged, at one end of the base 11 adjacent to the coil 21 in the length direction, on two sides of the base 11 in the width direction as viewed in a direction orthogonal to the mount surface 13. The first coil terminals 22 extend from outside the compartment 14 into the compartment 14 in the direction intersecting with the mount surface 13 (e.g., a direction substantially parallel to the coil axis L) and are fixed to the base 11 near the coil 21.

The second coil terminals 23 are electrically connected to the coil 21. The second coil terminals 23, each corresponding to one of the first coil terminals 22, are electrically independent of the first coil terminals 22. In detail, the second coil terminals 23 are fixed on two sides of the flange 241 on the spool 24 in the width direction of the base 11 as viewed in the direction orthogonal to the mount surface 13, and extend in the direction intersecting with the mount surface 13 (e.g., the direction substantially parallel to the coil axis L) from the flange 241 on the spool 24 and toward the base 11.

Figure 2:
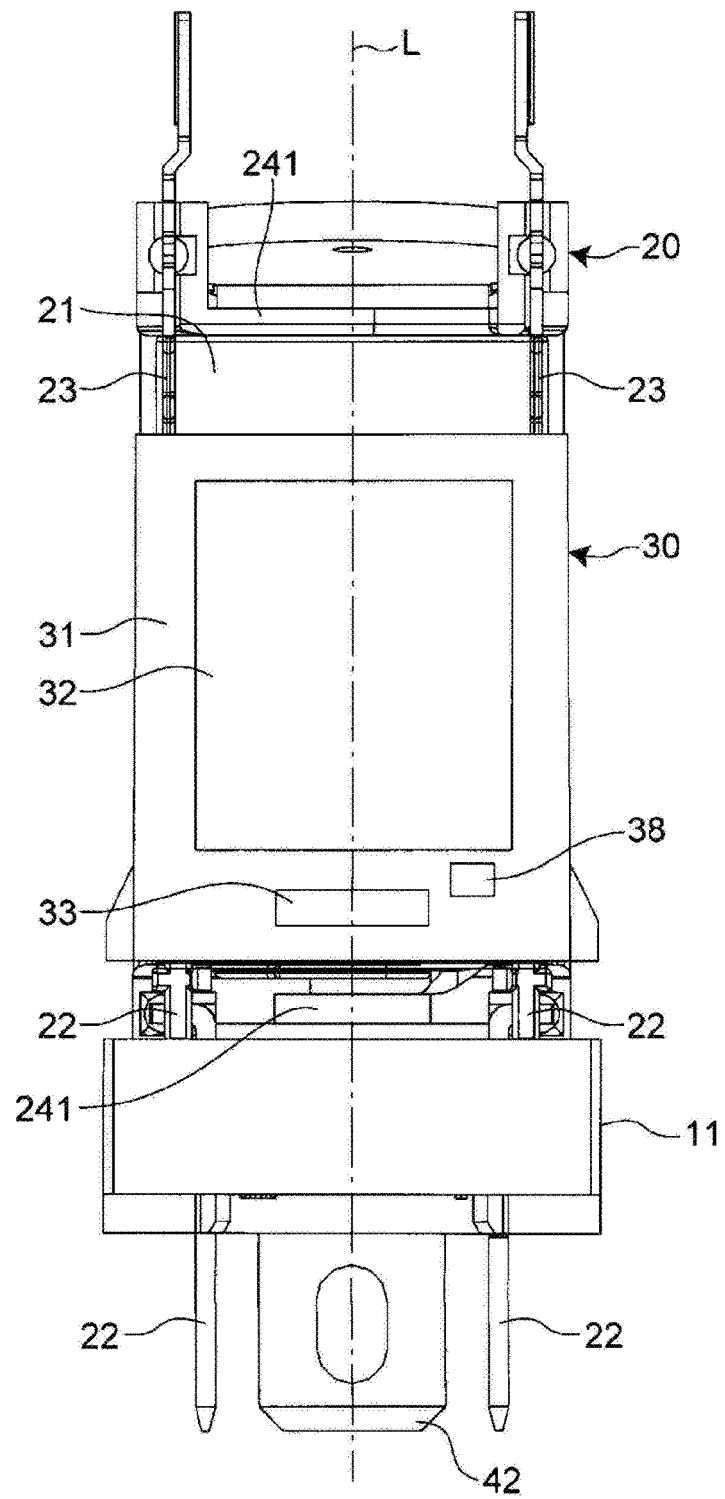
FIG. 2 is a side view of the electromagnetic relay shown in FIG. 1 excluding a case.

Thus, as shown in FIG. 2, each first coil terminal 22 and the corresponding second coil terminal 23 are arranged in series and substantially parallel to the coil axis L. In FIG. 2, the case 12 is not shown.

Figure 3:
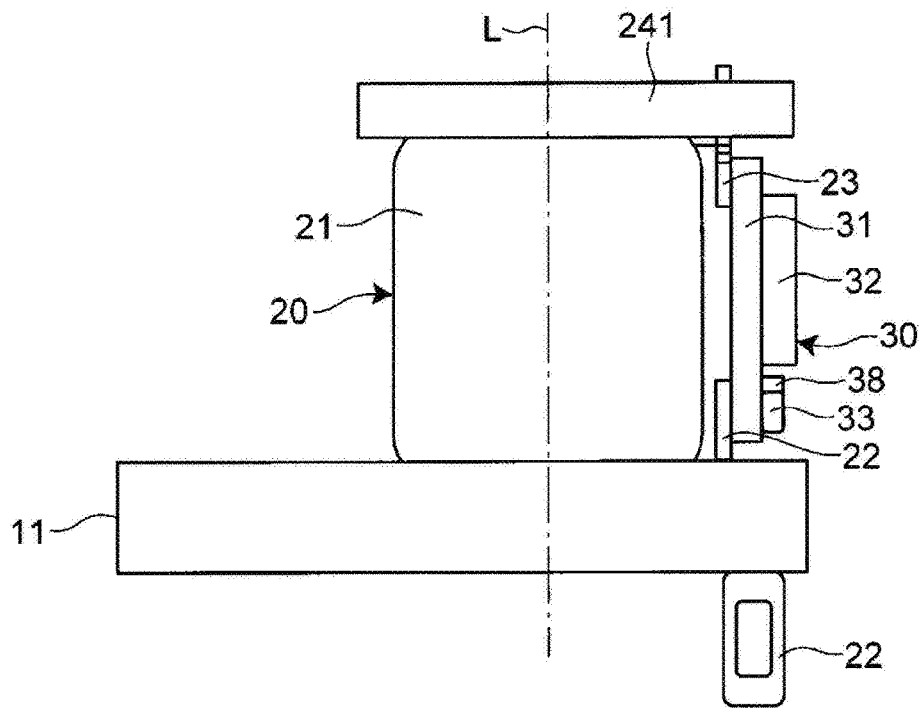
FIG. 3 is a schematic front view of the electromagnetic relay shown in FIG. 1 excluding the case and a contact mechanism.
Figure 4:
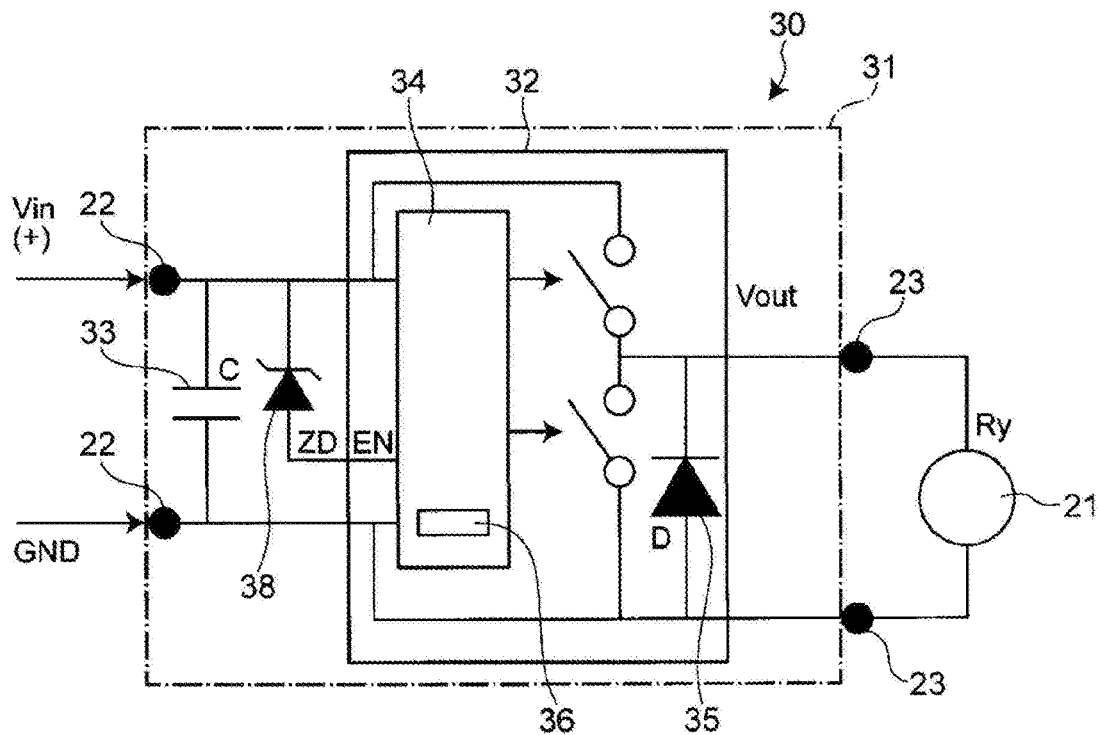
FIG. 4 is a circuit diagram of an integrated circuit (IC) converter module 30 in the electromagnetic relay shown in FIG. 1.

As shown in FIG. 1, the IC converter module 30 is located adjacent to the coil 21 in the electromagnet 20 and connected to the first coil terminals 22 and the second coil terminals 23. As shown in FIG. 2, the IC converter module 30 includes a board 31, and a voltage converter 32, a capacitor 33, and a Zener diode 38 that are fixed on the same surface of the board 31. As shown in FIG. 3, the board 31 in the IC converter module 30 extends parallel to the coil axis L and between the first coil terminals 22 and the second coil terminals 23. As shown in FIG. 4, the capacitor 33 is located between the first coil terminal 22 connected to Vin (+) and the first coil terminal 22 connected to GND. The Zener diode 38 is located between an EN terminal of the voltage converter 32 that functions as a gate for driving the electromagnetic relay 1 and the Vin (+) first coil terminal 22. In FIG. 3, the case 12 and the contact mechanism 40 are not shown.

The voltage converter 32 is located adjacent to the coil 21 in the compartment 14 and is electrically connected to the first coil terminals 22 and the second coil terminals 23. The voltage converter 32 converts a power supply voltage input through one of the first coil terminals 22 and outputs the resultant power supply voltage to the electromagnet 20 through one of the second coil terminals 23.

In detail, the voltage converter 32 is an IC converter including a switching controller 34 that lowers an input power supply voltage (e.g., 48 VDC) to a set value (e.g., 5 VDC) different from the input power supply voltage and outputs the resultant power supply voltage as shown in FIG. 4. The switching controller 34 includes a time measurement unit 36 that measures the time elapsed from when the resultant power supply voltage is output through one of the second coil terminals 23. When the time measured by the time measurement unit 36 reaches a predetermined time (time taken for the operation of the electromagnetic relay 1, for example, 70 ms), the switching controller 34 lowers the power supply voltage, which is to be output after voltage conversion, to a value lower than the set value (e.g., from 5 VDC to 2.5 VDC) and outputs the resultant power supply voltage to the electromagnet 20. The set value is preset in accordance with, for example, a power supply voltage to be input.

The voltage converter 32 includes (or incorporates) a surge voltage absorbing diode 35. The surge voltage absorbing diode 35 is located parallel to the coil 21 in the electromagnet 20 to absorb a surge voltage generated in the coil 21 when the power supply voltage input is stopped.

The contact mechanism 40 is located adjacent to the electromagnet 20 and opposite to the IC converter module 30 from the electromagnet 20 in the length direction of the base 11. The contact mechanism 40 includes a movable contact terminal 41, which is a substantially rectangular plate, and two fixed contact terminals 42, which are substantially rectangular plates, located with the movable contact terminal 41 between them in a direction orthogonal to the plate surface of the movable contact terminal 41. The movable contact terminal 41 and the fixed contact terminals 42 extend from outside the compartment 14 into the compartment 14 and are electrically independent of one another with their plate surfaces facing one another. The movable contact terminal 41 includes a movable contact 411 on its one end exposed in the compartment 14. Each fixed contact terminal 42 includes a fixed contact 421 facing the movable contact 411 on its one end exposed in the compartment 14.

The electromagnet 20 is connected to the movable contact terminal 41 in the compartment 14 with a movable part 50 between them. The movable part 50 is driven in the length direction of the base 11 depending on whether the electromagnet 20 is energized or de-energized to allow the movable contact 411 to come in contact with or separate from the fixed contacts 421.

The electromagnetic relay 1 includes the voltage converter 32 that uses one power supply voltage selected from multiple different power supply voltages and can thus use multiple different power supply voltages without replacement of its components (e.g., a coil). This eliminates replacement of any component of the electromagnetic relay 1 depending on the power supply voltage to be input, thus improving the productivity of the electromagnetic relay 1. This structure can avoid troubles caused by selecting an inappropriate electromagnetic relay 1 when multiple different power supply voltages are applied.

The voltage converter 32 can use multiple different power supply voltages and thus simplifies the design of the sequence circuit in the IC converter module 30. This structure eliminates the circuit design for an operation from outside the electromagnetic relay 1 and increases the space efficiency of a board on which the electromagnetic relay 1 is mounted, enabling the electromagnetic relay 1 to be versatile.

The voltage converter 32 includes the time measurement unit 36 that measures the time elapsed from when a power supply voltage is output through one of the second coil terminals 23, and lowers the power supply voltage to a value lower than the set value and outputs the resultant power supply voltage when the time measured by the time measurement unit 36 reaches the predetermined time. The electromagnetic relay 1 can reduce power consumption.

To reduce the power consumption of the electromagnetic relay 1, the spring load of the movable contact terminal 41 including the movable contact 411 may be reduced to reduce the power consumption of the coil 21. However, this shortens the contact life of the electromagnetic relay 1. The power consumption of the electromagnetic relay 1 can be reduced without reducing the spring load of the movable contact terminal 41, and thus without shortening the contact life.

The electromagnetic relay 1 includes the coil 21 wound about the coil axis L extending in the direction intersecting with the mount surface 13, and further the IC converter module 30 including the board 31 extending parallel to the coil axis L and between the first coil terminals 22 and the second coil terminals 23, and the voltage converter 32, the capacitor 33, and the Zener diode 38 that are fixed on the same surface of the board 31. This structure reduces wasted space in the compartment 14 in the electromagnetic relay 1, thus downsizing the electromagnetic relay 1.

The Zener diode 38 is located between the EN terminal of the voltage converter 32 and the Vin (+) first coil terminal 22. The Zener diode 38 reduces vibrations in the electromagnetic relay 1 when, for example, the electromagnetic relay 1 is a self-reset electromagnetic relay, the Vin (+) first coil terminal 22 receives a sweep voltage, and the reset force of the electromagnetic relay 1 exceeds a voltage for driving the electromagnetic relay 1 (retention force) that is a power supply voltage output from the voltage converter 32. The Zener diode 38 may be eliminated when, for example, the Vin (+) first coil terminal 22 receives a power supply voltage other than a sweep voltage.

The first coil terminals 22 and the second coil terminals 23 are located near the coil 21 and arranged in series and parallel to the coil axis L. This structure reduces wasted space further in the compartment 14 in the electromagnetic relay 1, thus downsizing the electromagnetic relay 1 further.

The voltage converter 32 includes the surge voltage absorbing diode 35. The surge voltage absorbing diode 35 absorbs a surge voltage generated in the coil 21 when the power supply voltage input is stopped and thus prevents failures due to the surge voltage.

The electromagnetic relay 1 may include at least the voltage converter 32. Thus, the board 31 and the capacitor 33 may be eliminated, and other components may be added.

Figure 5:
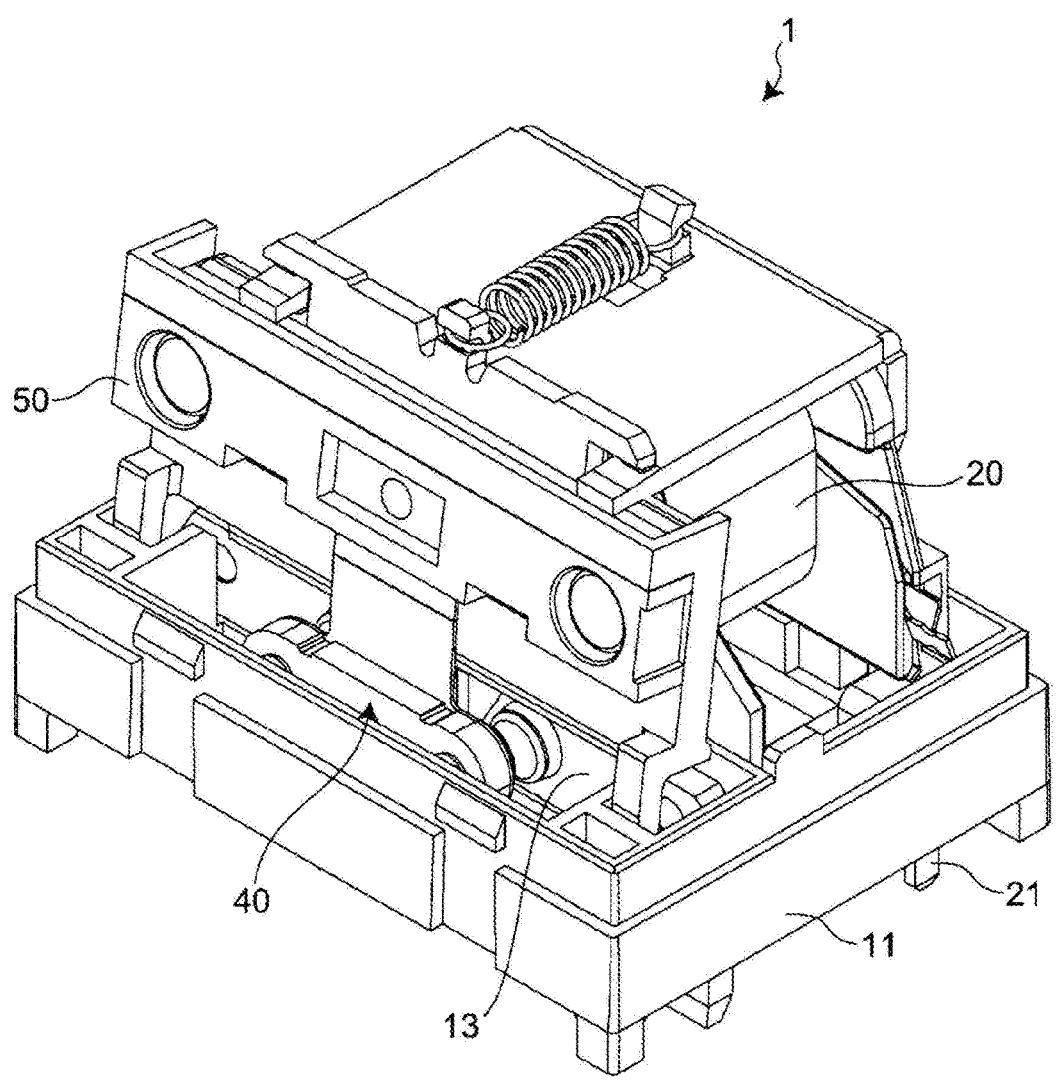
FIG. 5 is a perspective view of an electromagnetic relay according to a modification of the electromagnetic relay shown in FIG. 1.

The present disclosure is not limited to the electromagnetic relay 1 and is applicable to an electromagnetic relay with any structure. For example, an electromagnetic relay 1 shown in FIG. 5 includes an electromagnet 20 fixed to a mount surface 13 of a base 11, a movable part 50 rotatably supported by the electromagnet 20, and a contact mechanism 40 that is open and closed as the movable part 50 rotates. In FIG. 5, a case 12 is not shown.

Figure 6:
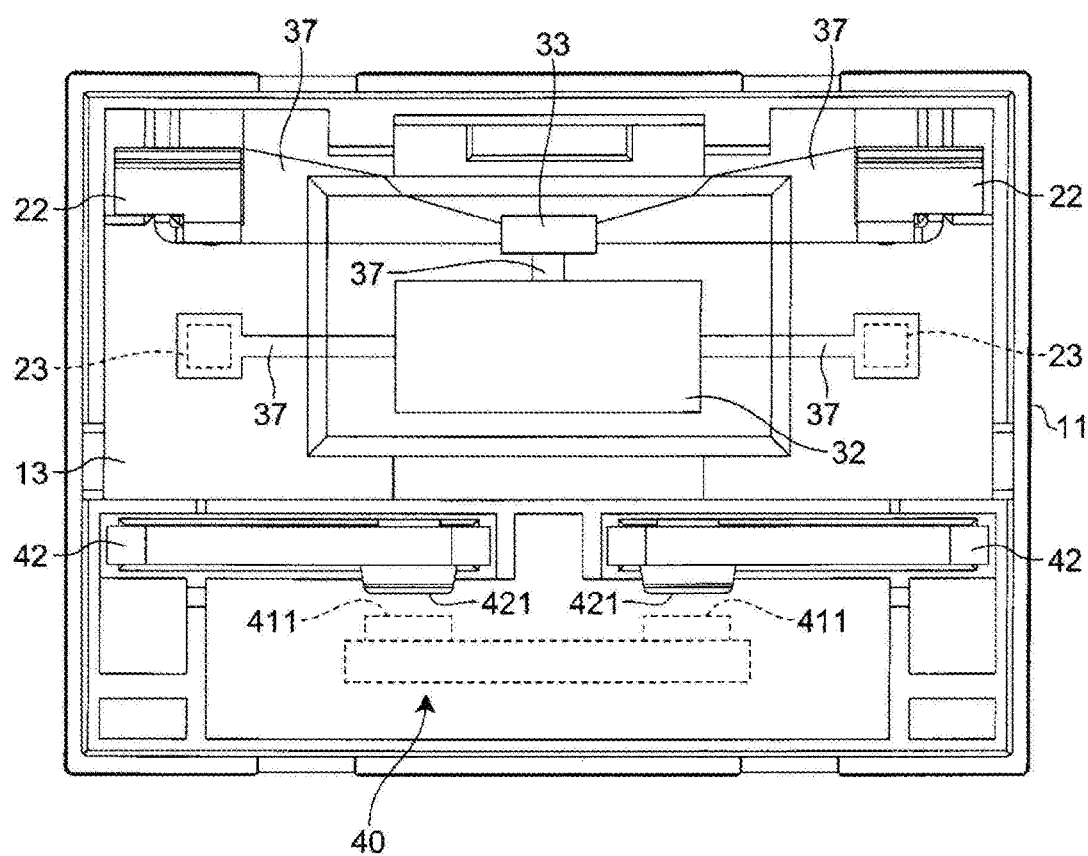
FIG. 6 is a top view of a base in the electromagnetic relay shown in FIG. 5.

As shown in FIG. 6, the electromagnetic relay 1 shown in FIG. 5 includes a voltage converter 32 and a capacitor 33 that are integral with the mount surface 13 of the base 11. First coil terminals 22, second coil terminals 23, the voltage converter 32, and the capacitor 33 are interconnected through conductive parts 37 formed by, for example, cream solder printing.

In this manner, the voltage converter 32 may be integral with the mount surface 13 of the base 11. The electromagnetic relay 1 has high design freedom.

Although the electromagnetic relay 1 shown in FIG. 5 does not include a Zener diode 38, the electromagnetic relay 1 may include the Zener diode 38, for example, between the EN terminal of the voltage converter 32 and the Vin (+) first coil terminal 22 depending on the power supply voltage applied to the Vin (+) first coil terminal 22.

Figure 7:
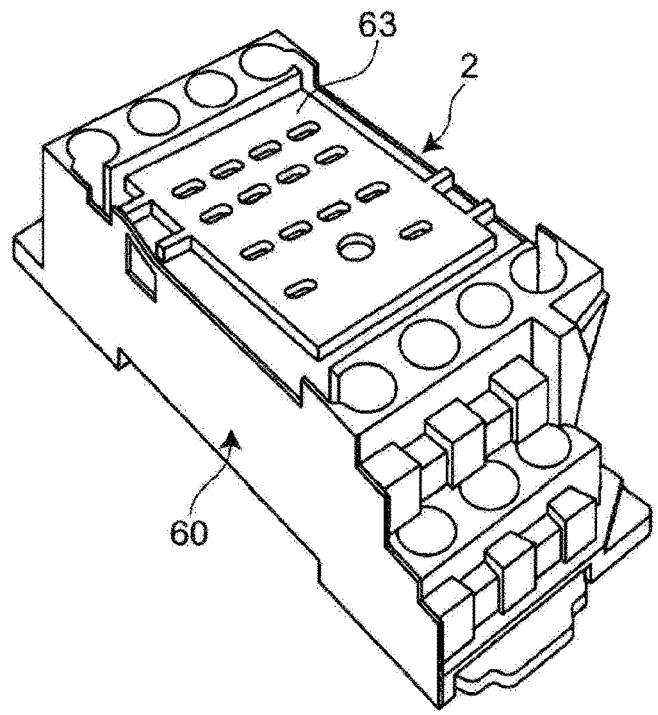
FIG. 7 is a perspective view of a terminal block according to another embodiment of the present disclosure.
Figure 8:
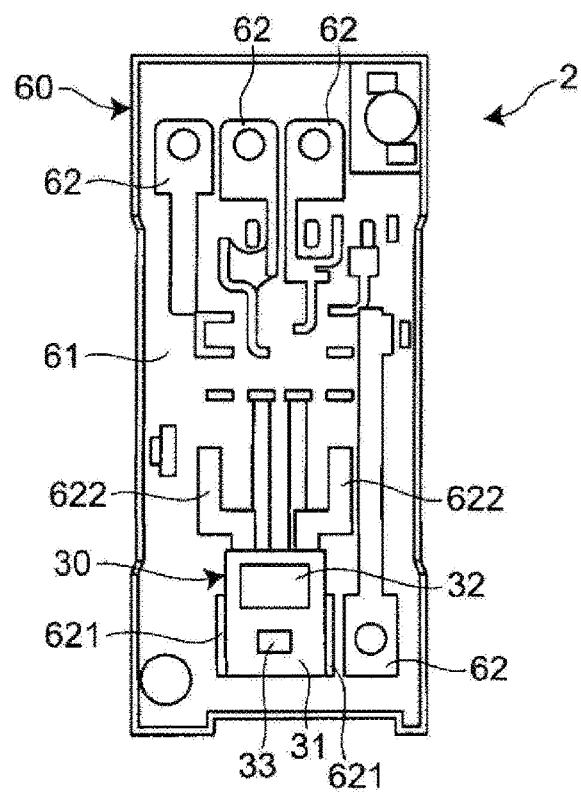
FIG. 8 is a rear view of the terminal block shown in FIG. 7.
Figure 9:
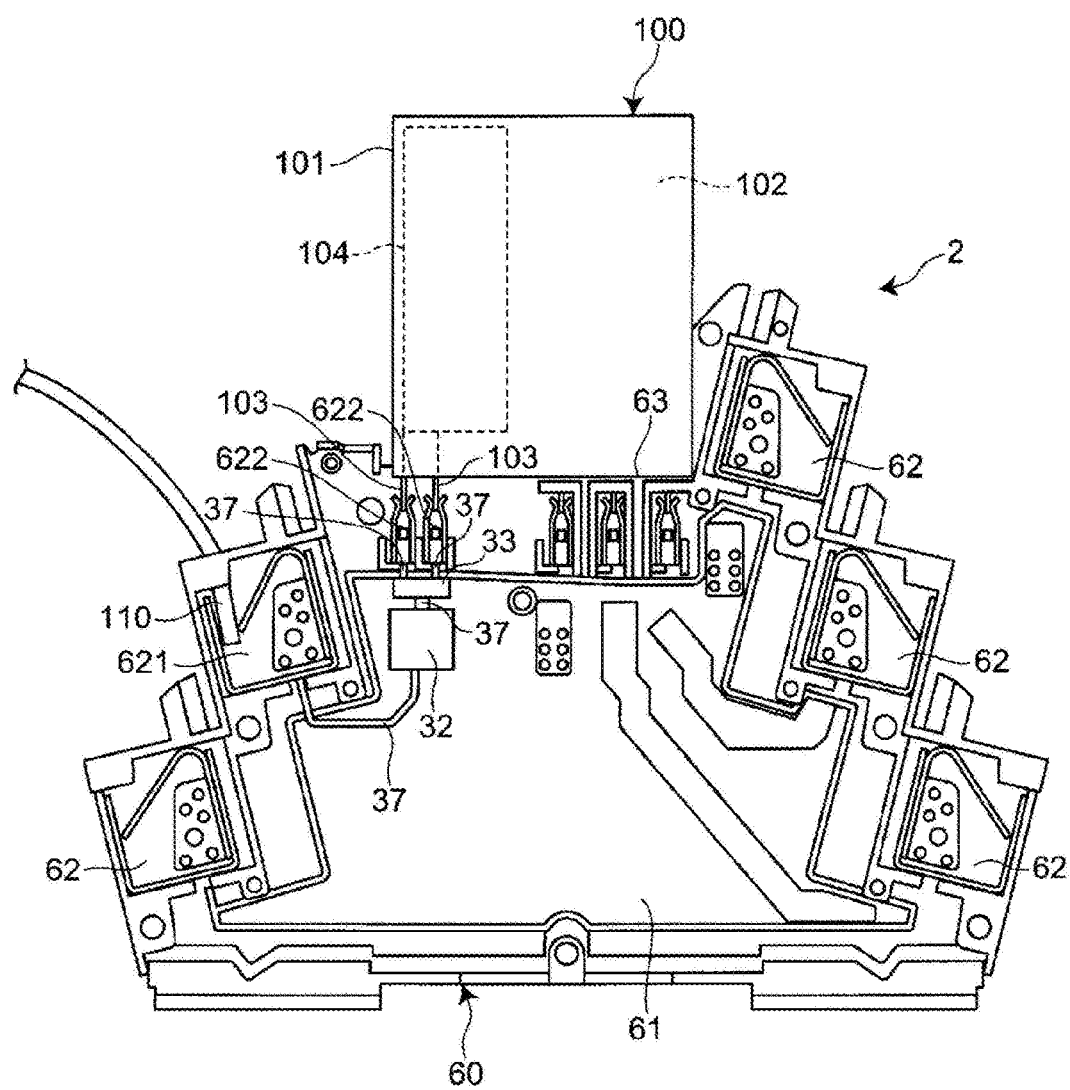
FIG. 9 is a front view of a terminal block according to a modification of the terminal block shown in FIG. 7.

As shown in FIGS. 7 to 9, the present disclosure is also applicable to a terminal block 2 connectable to an electromagnetic relay. For example, as shown in FIG. 8, the terminal block 2 shown in FIG. 7 includes a terminal block housing 60 including a second compartment 61 and multiple terminal connectors 62 accommodated in the second compartment 61.

As shown in FIG. 7, the terminal block housing 60 has a connecting surface 63 to which an electromagnetic relay 100 is connectable from outside. As shown in FIG. 8, the terminal connectors 62 include first terminal connectors 621 connectable to a power source terminal 110 of a power source (refer to FIG. 9) and second terminal connectors 622 connectable to coil terminals 103 (refer to FIG. 9) in the electromagnetic relay 100 connected to the connecting surface 63.

As shown in FIG. 8, in the terminal block 2 shown in FIG. 7, the IC converter module 30 including the voltage converter 32 is located between the first terminal connectors 621 and the second terminal connectors 622 in the second compartment 61 and electrically connected to the first terminal connectors 621 and the second terminal connectors 622.

The terminal block 2 includes the voltage converter 32 that uses one power supply voltage selected from multiple different power supply voltages and thus allows the connected electromagnetic relay 100 to use multiple different power supply voltages without replacement of components (e.g., a coil) of the electromagnetic relay 100. This eliminates replacement of any component of the connected electromagnetic relay 100 depending on the power supply voltage to be input, thus improving the productivity of the electromagnetic relay 100. This structure can avoid troubles caused by connecting an inappropriate electromagnetic relay 100 when multiple different power supply voltages are applied.

As shown in FIG. 9, the electromagnetic relay 100 includes, for example, a relay housing 101 including an internal first compartment 102 and an electromagnet 104 housed in the first compartment 102. The electromagnet 104 includes the coil terminals 103 extending from outside the first compartment 102 into the first compartment 102. The electromagnet 104 is housed in the first compartment 102, fixed to the relay housing 101, and powered by the power source through the coil terminals 103.

The terminal block 2 shown in FIG. 9 receives the electromagnetic relay 100 connected, and includes the power source terminal 110 of the power source connected to the first terminal connector 621. The terminal block 2 shown in FIG. 9 includes the voltage converter 32 and the capacitor 33 that are integral with the terminal block housing 60 in the second compartment 61. The first terminal connector 621, the second terminal connectors 622, the voltage converter 32, and the capacitor 33 are interconnected through the conductive parts 37 formed by, for example, cream solder printing.

The voltage converter 32 is integral with the terminal block housing 60 in the second compartment 61. This increases the design freedom of the terminal block 2.

Although the terminal block 2 shown in FIGS. 7 to 9 does not include the Zener diode 38, the terminal block 2 may include the Zener diode 38, for example, between the EN terminal of the voltage converter 32 and the Vin (+) first coil terminal 22 depending on the power supply voltage applied to the Vin (+) first coil terminal 22.

The voltage converter 32 may include either or both the surge voltage absorbing diode 35 and the time measurement unit 36. The voltage converter 32 including the surge voltage absorbing diode 35 absorbs a surge voltage generated in the electromagnet 20 in the electromagnetic relay 100 when the power supply voltage input is stopped and thus prevents failures due to the surge voltage. The voltage converter 32 including the time measurement unit 36 lowers the power supply voltage to a value lower than the set value and outputs the resultant power supply voltage when the time measured by the time measurement unit 36 reaches the predetermined time. This structure reduces the power consumption of the electromagnetic relay 100.

The embodiments of the present disclosure are described above in detail with reference to the drawings. The embodiments may be modified in various forms described below. The reference numerals added to the components below are for illustrative purpose.

An electromagnetic relay 1 according to a first aspect of the present disclosure includes a base 11 having a mount surface 13, a case 12 attached to the base 11 and covering the mount surface 13, the case 12 and the mount surface 13 defining a compartment 14, an electromagnet 20 including a coil 21, first coil terminals 22 extending from outside the compartment 14 into the compartment 14 in a direction intersecting with the mount surface 13 and fixed to the base 11, and second coil terminals 23 electrically connected to the coil 21 and located electrically independent of the first coil terminals 22, the electromagnet 20 being housed in the compartment 14 and fixed to the mount surface 13, and a voltage converter 32 located adjacent to the coil 21 in the compartment 14 and electrically connected to the first coil terminals 22 and the second coil terminals 23, the voltage converter 32 being configured to convert a power supply voltage input through one of the first coil terminals 22 to a set value different from the input power supply voltage and output the power supply voltage to the electromagnet 20 through one of the second coil terminals 23.

The electromagnetic relay 1 according to the first aspect includes the voltage converter 32 that uses one power supply voltage selected from multiple different power supply voltages and can thus use multiple different power supply voltages without replacement of its components (e.g., a coil).

In the electromagnetic relay 1 according to a second aspect of the present disclosure, the voltage converter 32 includes a time measurement unit 36 configured to measure a time elapsed from when the power supply voltage is output through one of the second coil terminals 23, and the voltage converter 32 lowers the power supply voltage to a value lower than the set value and outputs the power supply voltage when the time measured by the time measurement unit 36 reaches a predetermined time.

The electromagnetic relay 1 according to the second aspect includes the voltage converter 32 that lowers the power supply voltage to a value lower than the set value and outputs the power supply voltage when the time measured by the time measurement unit 36 reaches the predetermined time and can thus reduce power consumption.

In the electromagnetic relay 1 according to a third aspect of the present disclosure, the coil 21 is wound about a coil axis L extending in the direction intersecting with the mount surface 13, and the electromagnetic relay 1 further includes an integrated circuit converter module 30 including a board 31 that extends parallel to the coil axis L and between the first coil terminals 22 and the second coil terminals 23 and including the voltage converter 32, a capacitor 33, and a Zener diode 38 that are fixed on a same surface of the board 31.

The electromagnetic relay 1 according to the third aspect including the integrated circuit converter module 30 reduces wasted space in the compartment 14 in the electromagnetic relay 1 and can be downsized.

The electromagnetic relay 1 reduces internal vibrations when, for example, the electromagnetic relay 1 is a self-reset electromagnetic relay, the Vin (+) first coil terminal 22 receives a sweep voltage, and the reset force of the electromagnetic relay 1 exceeds a voltage for driving the electromagnetic relay 1 (retention force) that is a power supply voltage output from the voltage converter 32.

In the electromagnetic relay 1 according to a fourth aspect of the present disclosure, the first coil terminals 22 and the second coil terminals 23 are located near the coil 21 and arranged in series and parallel to the coil axis L.

The electromagnetic relay 1 according to the fourth aspect reduces wasted space further in the compartment 14 in the electromagnetic relay 1 and can be downsized further.

In the electromagnetic relay 1 according to a fifth aspect of the present disclosure, the voltage converter 32 is integral with the mount surface 13.

The electromagnetic relay 1 according to the fifth aspect has higher design freedom.

In the electromagnetic relay 1 according to a sixth aspect of the present disclosure, the voltage converter 32 includes a surge voltage absorbing diode 35.

The electromagnetic relay 1 according to the sixth aspect absorbs a surge voltage generated in the coil 21 when the power supply voltage input is stopped and thus prevents failures due to the surge voltage.

A terminal block 2 according to a seventh aspect of the present disclosure is connectable to an electromagnetic relay 100 including a relay housing 101 and an electromagnet 104, the relay housing 101 including an internal first compartment 102, the electromagnet 104 including coil terminals 103 extending from outside the first compartment 102 into the first compartment 102, being housed in the first compartment 102, being fixed to the relay housing 101, and to be powered by a power source through the coil terminals 103. The terminal block 2 includes a terminal block housing 60 including an internal second compartment 61 and having a connecting surface 63 to which the electromagnetic relay 100 is connectable from outside, first terminal connectors 621 housed in the second compartment 61 and connectable to a power source terminal 110 of the power source, second terminal connectors 622 housed in the second compartment 61 and connectable to the coil terminals 103 in the electromagnetic relay 100 connected to the connecting surface 63, and a voltage converter 32 housed in the second compartment 61 and electrically connected to the first terminal connectors 621 and the second terminal connectors 622, the voltage converter 32 being configured to convert a power supply voltage input through one of the first terminal connectors 621 to a set value different from the input power supply voltage and output the power supply voltage to the electromagnet 104 through one of the second terminal connectors 622.

The terminal block 2 according to the seventh aspect includes the voltage converter 32 that uses one power supply voltage selected from multiple different power supply voltages and thus allows the connected electromagnetic relay 100 to use multiple different power supply voltages without replacement of components (e.g., coil) of the electromagnetic relay 100.

In the terminal block 2 according to an eighth aspect of the present disclosure, the voltage converter 32 includes a time measurement unit 36 configured to measure a time elapsed from when the power supply voltage is output through one of the second terminal connectors 622, and the voltage converter 32 lowers the power supply voltage to a value lower than the set value and outputs the power supply voltage when the time measured by the time measurement unit 36 reaches a predetermined time.

The terminal block 2 according to the eighth aspect includes the voltage converter 32 that lowers the power supply voltage to a value lower than the set value and outputs the power supply voltage when the time measured by the time measurement unit 36 reaches the predetermined time and thus reduces the power consumption of the electromagnetic relay 100.

The terminal block 2 according to a ninth aspect of the present disclosure further includes an integrated circuit converter module 30 including a board 31, and the voltage converter 32, a capacitor 33, and a Zener diode 38 that are fixed on a same surface of the board 31.

The terminal block 2 according to the ninth aspect enables the electromagnetic relay 100 with higher design freedom.

The terminal block 2 reduces vibrations in the electromagnetic relay 100 when, for example, the electromagnetic relay 100 is a self-reset electromagnetic relay, the Vin (+) first coil terminal 22 receives a sweep voltage, and the reset force of the electromagnetic relay 100 exceeds a voltage for driving the electromagnetic relay 100 (retention force) that is the power supply voltage output from the voltage converter 32.

In the terminal block 2 according to a tenth aspect of the present disclosure, the voltage converter 32 is integral with the terminal block housing 60 in the second compartment 61.

The terminal block 2 according to the tenth aspect enables the electromagnetic relay 100 with higher design freedom.

In the terminal block 2 according to an eleventh aspect of the present disclosure, the voltage converter 32 includes a surge voltage absorbing diode 35.

The terminal block 2 according to the eleventh aspect absorbs a surge voltage generated in the electromagnet 20 in the electromagnetic relay 100 when the power supply voltage input is stopped and thus prevents failures due to the surge voltage.

The embodiments or modifications described above may be combined with one another to produce their advantageous effects. One or more embodiments may be combined with other embodiments, one or more modifications may be combined with other modifications, or one or more embodiments may be combined with one or more modifications. The features of different embodiments or different modifications may also be combined.

Although the present disclosure is fully described in relation to preferable embodiments with reference to the appended drawings, modifications or changes to the present disclosure are apparent to those skilled in the art. Such modifications or changes are intended to fall within the scope of the present disclosure defined by the appended claims unless departing therefrom.

INDUSTRIAL APPLICABILITY

The electromagnetic relay and the terminal block according to the embodiments of the present disclosure may be usable for a power conditioner.

The invention claimed is:

1. An electromagnetic relay comprising:
a base comprising a mount surface;
a case attached to the base and covering the mount surface, the case and the mount surface defining a compartment;
an electromagnet comprising a coil, first coil terminals extending from outside the compartment into the compartment in a direction intersecting with the mount surface and fixed to the base, and second coil terminals electrically connected to the coil and located electrically independent of the first coil terminals, the electromagnet being housed in the compartment and fixed to the mount surface; and
a voltage converter located adjacent to the coil in the compartment and electrically connected to the first coil terminals and the second coil terminals, the voltage converter being configured to convert a power supply voltage input through one of the first coil terminals to a set value different from the input power supply voltage and output the power supply voltage to the electromagnet through one of the second coil terminals, wherein
the voltage converter comprises a time measurement unit configured to measure a time elapsed from when the power supply voltage is output through one of the second coil terminals, and
the voltage converter lowers the power supply voltage to a value lower than the set value and outputs the power supply voltage when the time measured by the time measurement unit reaches a predetermined time.

2. The electromagnetic relay according to claim 1, wherein
the coil is wound about a coil axis extending in the direction intersecting with the mount surface, and
the electromagnetic relay further comprises an integrated circuit converter module comprising a board that extends parallel to the coil axis and between the first coil terminals and the second coil terminals and comprising the voltage converter, a capacitor, and a Zener diode that are fixed on a same surface of the board.

3. The electromagnetic relay according to claim 1, wherein
the first coil terminals and the second coil terminals are located near the coil and arranged in series and parallel to the coil axis.

4. The electromagnetic relay according to claim 1, wherein the voltage converter is integral with the mount surface.

5. The electromagnetic relay according to claim 1, wherein
the voltage converter comprises a surge voltage absorbing diode.

6. A terminal block connectable to an electromagnetic relay comprising a relay housing and an electromagnet, the relay housing comprising an internal first compartment, the electromagnet comprising coil terminals extending from outside the first compartment into the first compartment, being housed in the first compartment, being fixed to the relay housing, and to be powered by a power source through the coil terminals, the terminal block comprising:
  a terminal block housing comprising an internal second compartment and a connecting surface to which the electromagnetic relay is connectable from outside;
  first terminal connectors housed in the second compartment and connectable to a power source terminal of the power source;
  second terminal connectors housed in the second compartment and connectable to the coil terminals in the electromagnetic relay connected to the connecting surface; and
  a voltage converter housed in the second compartment and electrically connected to the first terminal connectors and the second terminal connectors, the voltage converter being configured to convert a power supply voltage input through one of the first terminal connectors to a set value different from the input power supply voltage and output the power supply voltage to the electromagnet through one of the second terminal connectors, wherein
the voltage converter comprises a time measurement unit configured to measure a time elapsed from when the power supply voltage is output through one of the second terminal connectors, and
the voltage converter lowers the power supply voltage to a value lower than the set value and outputs the power supply voltage when the time measured by the time measurement unit reaches a predetermined time.

7. The terminal block according to claim 6, further comprising:
  an integrated circuit converter module comprising a board, and the voltage converter, a capacitor, and a Zener diode that are fixed on a same surface of the board.

8. The terminal block according to claim 6, wherein
the voltage converter is integral with the terminal block housing in the second compartment.

9. The terminal block according to claim 6, wherein
the voltage converter comprises a surge voltage absorbing diode.

* * * * *